Oct. 26, 1965     A. H. DI SETTEMBRINI     3,213,725
DEVICE FOR CUTTING OFF PACKAGING, MORE PARTICULARLY
OF PLASTIC MATERIAL
Filed March 11, 1964     2 Sheets-Sheet 1

INVENTOR
ANTOINE HENRI
DI SETTEMBRINI
by Mason, Kolehmainen,
Rathburn and Wyss
ATTORNEYS.

Oct. 26, 1965  A. H. DI SETTEMBRINI  3,213,725
DEVICE FOR CUTTING OFF PACKAGING, MORE PARTICULARLY
OF PLASTIC MATERIAL
Filed March 11, 1964  2 Sheets-Sheet 2
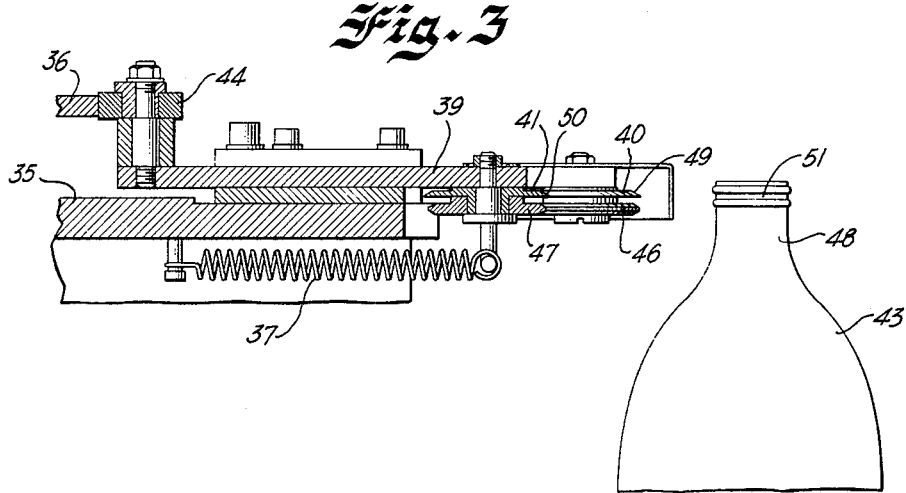
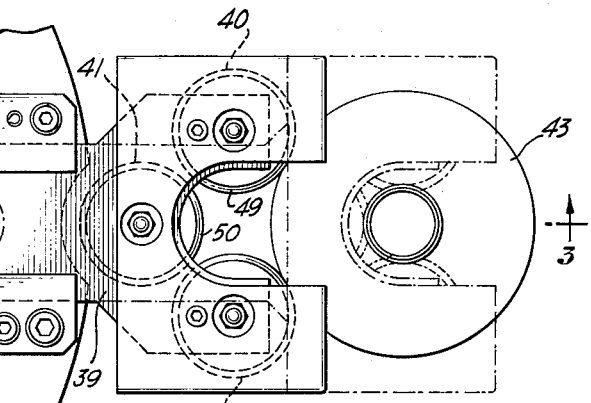
INVENTOR
ANTOINE HENRI DI SETTEMBRINI
by
Mason, Kolehmainen, Rathburn and Wyss
ATTORNEYS

United States Patent Office 3,213,725
Patented Oct. 26, 1965

3,213,725
DEVICE FOR CUTTING OFF PACKAGING, MORE PARTICULARLY OF PLASTIC MATERIAL
Antoine Henri Di Settembrini, Moulin de la Drille, Epouville (Seine Maritime), France
Filed Mar. 11, 1964, Ser. No. 350,973
Claims priority, application France, Mar. 16, 1963, 928,243, Patent 1,376,498
2 Claims. (Cl. 82—56)

The present invention relates to cut-off apparatus and, more particularly, to apparatus for cutting off the ends of elongated articles such as plastic bottles and the like.

More specifically, it is an object of the present invention to provide a cut-off apparatus for cutting off the necks of plastic bottles just prior to the sealing of the bottles.

Another object of the invention is the provision of an automatic cut-off apparatus wherein the articles are conveyed automatically into position wherein the ends are cut off.

Another object of the invention is the provision of a cut-off apparatus wherein the articles are automatically ejected after the end has been cut off.

One embodiment of the invention is illustrated in the attached drawings, in which:

FIG. 2 is a top plan view of one of the cut-off heads of the apparatus of FIG. 1; and FIG. 3 is a sectional view taken substantially along line A—A of FIG. 2.

Figure 1:
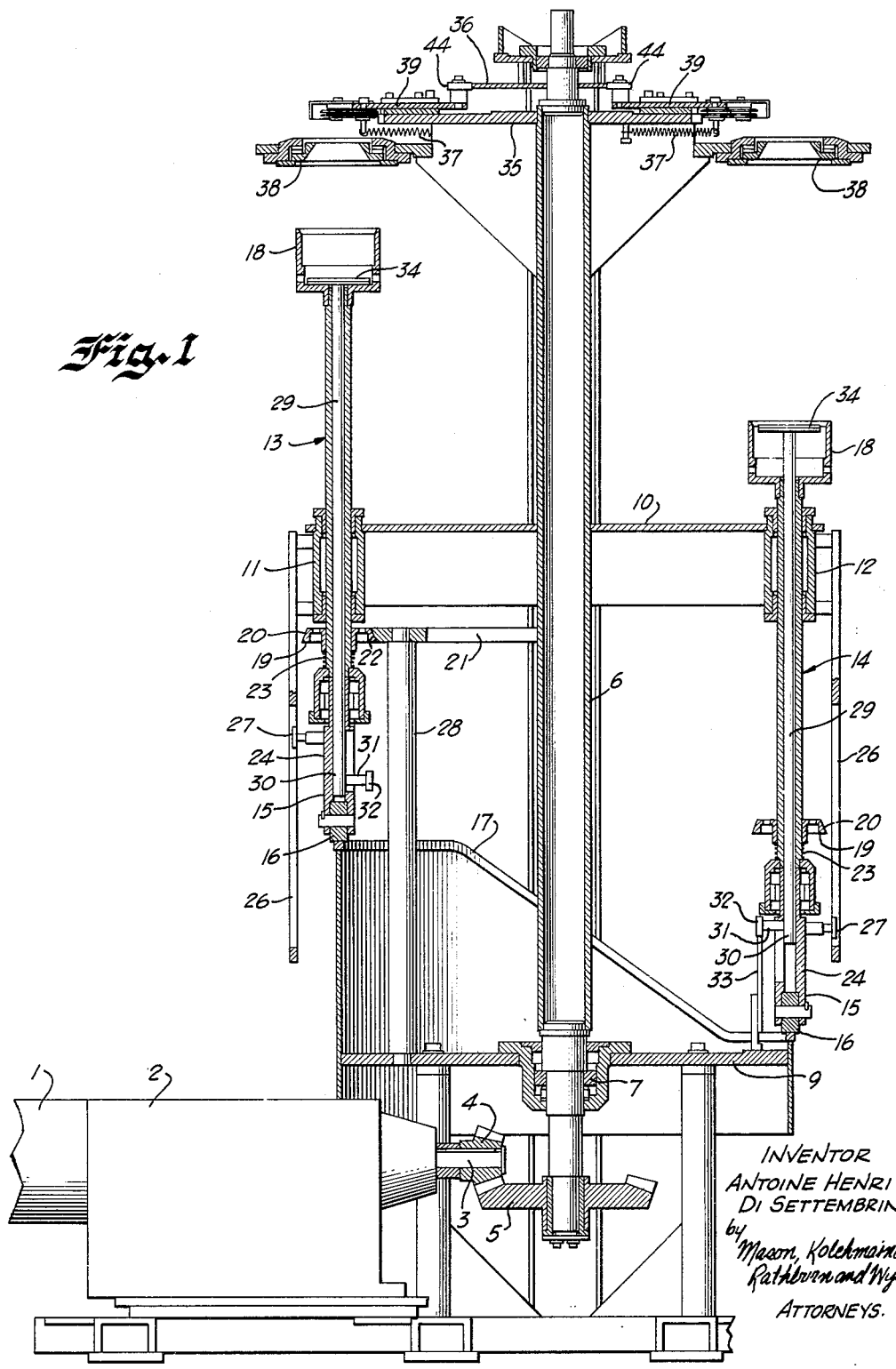
FIG. 1 is a side elevational view with portions in section of a cut-off apparatus constructed in accordance with the present invention.

Referring now to FIG. 1, the cut-off apparatus of the present invention includes a central spindle or shaft 6 which is rotated to drive the various elements of the apparatus enabling articles placed in the apparatus to have their ends cut off.

The spindle or central shaft 6 is driven by a motor 1 connected to a gear reduction unit 2. The gear reduction unit includes an output shaft 3 having a beveled pinion 4 thereon which drivingly meshes with a bevel gear 5 on the central shaft 6. The shaft 6 is journaled for rotation in a bearing 7 carried by a frame 9 of the apparatus.

A circular plate 10 is secured to the central shaft 6 at approximately the midpoint thereof and the plate carries a plurality of bearing assemblies 11 and 12 positioned around the periphery thereof. Article supporting shaft assemblies 13 and 14 are journaled for rotation and sliding movement in the bearing assemblies 11 and 12, respectively.

Rollers 16 are mounted at the lower ends 15 of the shaft assemblies 13 and 14 and the rollers move in contact with a circular cam 17 which is supported by the frame 9 of the apparatus. Cup-shaped, article holding support members 18 are mounted at the upper ends of the shaft assemblies 13 and 14 and, as the shafts move around the cam surface 17, the support members 18 are reciprocated vertically to move the articles held thereby into proper height for cut-off by a knife assembly adjacent the top of the spindle.

Disk members 19 having beveled edges 20 are mounted on the shaft assemblies 13 and 14 and the edges of the disks are adapted to engage an oppositely beveled edge surface 22 of a fixed semicircular cam plate 21 when the shafts are moved upwardly into cut-off position by the cam surface 17. As an example, the shaft assembly 13 in FIG. 1 is shown in an upper position wherein the disk 19 thereon is in engagement with the cam plate 21. Springs 23 are provided on the shafts to press the disks 19 into engagement with the cam plate 21 so that when so engaged the respective shaft will be axially rotated as it moves around the cam plate and, accordingly, an article placed in the support 18 thereon will be axially rotated. The cam plate 21 is fixedly supported on the frame 9 by means of vertical support members 28.

The rollers 16 at the lower ends 15 of the shaft assemblies 13 and 14 are carried by roller support members 24 which do not rotate axially as do the shafts associated therewith. Rotation of the support members 24 is prevented and vertical movement of the shaft assemblies is guided and insured by means of outer roller assemblies 27 which extend outwardly from the support members and are vertically movable in ramp assemblies 26. The ramp assemblies 26 are mounted to extend downwardly from the driving plate 10 in parallel relation with the shaft assemblies 13 and 14.

Each of the shaft assemblies 13 and 14 includes an outer rotating tube and a central ejector shaft 29 extending through the tube and vertically movable therein. The lower end of each shaft 29 is provided with a sleeve 30 which is slidable within the roller support member 24 of the shaft assembly. Short shafts 31 having rollers 32 on the ends thereof are mounted on the sleeve 30 to extend perpendicularly therefrom, and the shafts 31 are slidable within vertical slots provided in the roller support members 24. The upper ends of the shafts 29 are connected to ejector plates 34 which are movable relative to the article support members 18 to eject the articles therefrom after the upper ends have been cut off. A fixed ejector cam 33, carried on the frame 9, is provided to engage the rollers 32 and raise the central ejector shafts 29 and ejector plates 34 to eject the articles from the support members 18 at the proper time after cut-off.

A circular plate 35 is positioned at the upper end of the shaft 6 to support a plurality of cut-off devices or knife assemblies. The knife assemblies are moved into cutting position for cutting off the upper ends of the articles supported in the support members 18 by means of a fixed cam 36, and springs 37 are provided to return the knife assemblies to their original position after the cut-off operation is completed. In order to maintain the upper portion of the articles to be cut off in centered position and overcome the off-centering thrust of the knife assemblies as they engage the article, upper centering guides 38 are disposed directly above the shaft assemblies 13 and 14. An inner ring of the centering guide contacts the upper end of the articles as they move upwardly into the cut-off position and the inner ring is freely rotatable with the article during cut-off.

FIGS. 2 and 3 of the drawings illustrate the upper cut-off mechanism of the apparatus in a more detailed manner. Referring to FIG. 2, each knife assembly includes a plurality of cutting disks 40, 41, and 42 which are carried by a support member 39. The edges of the cutting disks are sharpened and penetrate the upper neck or end of an article 43 which is to be cut off when the knife assembly support member 39 is moved into cutting relation by the cam 36. The inner end of the support member 39 is provided with a roller 44 which contacts the cam 36 and the roller is pressed inwardly against the cam by the spring 37, as previously mentioned.

Beneath the cutting disks there are provided holding disks 46 and 47 (FIG. 3). These holding disks do not cut but are positioned to fit into grooves 51 which are formed above collars 48 provided on the articles 43 which are to be cut off. The disks 46 and 47 aid in holding the articles 43 so that the beveled knife edges 49 and 50 of the cutting disks 40, 41, and 42 can accurately and smoothly penetrate and cut off the upper necks of the articles.

Operation of the cut-off apparatus is as follows: An article, such as a plastic bottle 43 which is to have the upper neck cut off, is placed in the support member 18 on the shaft assembly 14 when positioned as shown in FIG. 1. As the spindle 6 and plate 10 are rotated, the shaft assembly 14 moves around the cam 17 and starts to rise to an upper cut-off position such as that shown in FIG. 1 for the shaft assembly 13.

When this occurs, the article 43 is held tightly in axially centered position on the shaft assembly 14 by means of the inner ring of the centering guide 38 which encircles the neck of the article and wedges the tower end of the article tightly against the support member 18 of the shaft assembly.

As the shaft assembly 14 reaches the upper cut-off position, the beveled disk 19 thereof comes into contact with the semicircular cam disk 21 and causes the shaft assembly to rotate and hence rotate the article held in the support 18 about its central axis. Simultaneously with the rotation of the article, the knife assembly above the shaft assembly 14 is moved outwardly into cutting relation with the article by the fixed cam 36 and the disks 40, 41, and 42 penetrate into the neck of the rotating article and sever the upper portion therefrom.

After the cut-off operation is completed, the cam 36 permits the knife assembly to move back inwardly under the influence of the spring 37, and at approximately the same time the disk 19 moves out of engagement with the semicircular cam plate 21, causing rotation of the shaft assembly 14 and article carried thereby to cease.

Continued rotation of the spindle 6 and circular drive plate 10 moves the shaft assembly 14 around to the descending portion of the circular cam 17 and, consequently, permits the article and support member 18 to move downwardly out of engagement with the knife assembly and centering guide. As the shaft assembly approaches the end of its downward movement, the roller 32 moves into contact with the ejector cam 33, causing the center shaft 29 and ejector plate 34 to rise momentarily and expel the article from the support cup 18, as shown in FIG. 1. After this occurs, the roller 32 moves past the ejector cam 33 permitting the ejector plate 34 to move downwardly into position at the bottom of the support member 18 so that a new article to be cut off can be placed in the support member and the cycle repeated.

The present invention provides a simple and fully automatic cut-off device having many advantages, one of which resides in the fact that the upper ends of the articles are held securely and firmly, resulting in uniform cut-off action without ragged or irregular edges.

While there have been illustrated and described several embodiments of the present invention, it will be appreciated that numerous changes and modifications will occur to those skilled in the art, and it is intended in the appended claims to cover all those changes and modifications which fall within the true spirit and scope of the present invention.

What is claimed as new and desired to be secured by Letters Patent of the United States is:

1. Apparatus for cutting off the ends of articles, such as the necks of plastic bottles and the like, said apparatus comprising an article-supporting shaft assembly movable in a circular path around a central spindle, said assembly including shaft means rotatable about its longitudinal axis and movable along said axis as said assembly moves around said circular path, first cam means in concentric circular arrangement about said spindle and engageable with said shaft means to axially reciprocate the latter between first and second operative positions during movement thereof around said circular path, second cam means having a beveled cam surface thereon for rotating said shaft means about its axis when said shaft means is in said first operative position, a circular drive disk axially movable on said shaft means and including a beveled frictional surface for engagement with said second cam means to rotate said shaft means, resilient means on said shaft means urging said drive disk in an axial direction thereon into driving engagement against the surface of said second cam means, said shaft means including support means for holding an article in axial alignment therewith with one end of said article exposed for cutting, knife means including cutting edges arranged to cut said article in a direction normal to the axis of said shaft means, and third cam means engageable with said knife means to move said cutting edges into cutting engagement with said one end of said article held by said support means when said shaft means is in said first operative position, said third cam means operable to permit movement of said cutting edges out of cutting engagement with said article when said shaft means is moved to said second operative position.

2. Apparatus as defined in claim 1 wherein said third cam means includes a fixed cam member, a knife support member having a plurality of cut-off disks thereon and movable in a radial direction with respect to said shaft means, said cut-off disks forming said cutting edges, and resilient means urging said knife support member against said fixed cam.

References Cited by the Examiner

UNITED STATES PATENTS

| | | | |
|---|---|---|---|
| 1,208,978 | 12/16 | Kadow | 65—177 |
| 1,269,077 | 6/18 | Hamann | 15—63 |
| 2,232,021 | 2/41 | Calleson et al. | 82—56 |
| 2,962,846 | 12/60 | Marindin. | |

FOREIGN PATENTS 142,760   12/61   Russia.

WILLIAM W. DYER, JR., *Primary Examiner.*

LEON PEAR, *Examiner.*